May 11, 1971  A. J. HOERNER ET AL  3,578,550
FOIL-BACKED NON-SKID SHEET
Filed Jan. 31, 1969
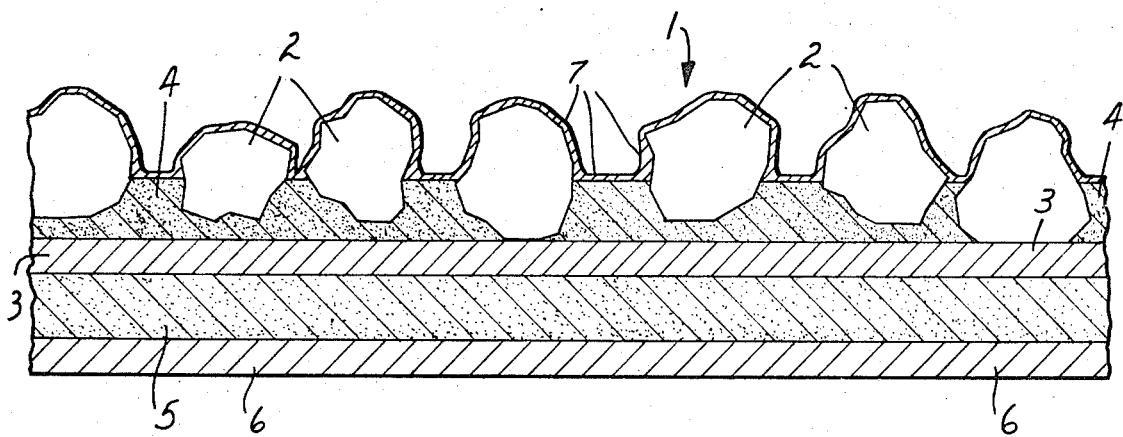
INVENTORS
ALFRED J. HOERNER
GEORGE M. SEITER
BY Kinney, Alexander,
Sell, Steldt & DeLaHunt
ATTORNEYS United States Patent Office 3,578,550
Patented May 11, 1971

3,578,550
FOIL-BACKED NON-SKID SHEET
Alfred J. Hoerner, St. Paul, and George M. Seiter, Golden Valley Village, Minn., assignors to Minnesota Mining and Manufacturing Company, St. Paul, Minn.
Filed Jan. 31, 1969, Ser. No. 795,455
Int. Cl. B32b 5/16; C09j 7/02
U.S. Cl. 161—162          8 Claims

ABSTRACT OF THE DISCLOSURE

Foil-backed non-skid sheet material suitable for installation on rough, irregular, and curved surfaces with which it maintains intimate contact over extended periods of time. An "open coat" single layer of frictional particles is adhered in a regular manner to an annealed aluminum foil backing by a flexible, elastoplastic, silane-containing polyurethane binder. The rear face of the foil is coated with a normally tacky and pressure-sensitive adhesive.

BACKGROUND OF THE INVENTION

This invention relates to foil-backed non-skid sheet material suitable for installation on rough, irregular, and curved surfaces.

One popular form of non-skid sheet material is made by adhering abrasive granules to a resin-impregnated fabric backing by means of a relatively rigid adhesive. Although extremely useful on flat surfaces, this product is less effective on curved surfaces where its stiffness acts as a memory, pulling it loose over a period of time. Further, this product cannot be applied effectively to diamond tread steel and similar surfaces. Indeed, when this product is applied over any extremely rough or irregular surface, it is necessary to use a blowtorch to insure conformability, grind the surface smooth, or apply a leveling under-layment coating to the surface.

Another popular form of non-skid sheet material features rubber or cork particles adhered to a polyester film backing with a relatively flexible adhesive. Although this product can be permanently adhered to many curved surfaces, it shares the earlier products inability to conform to diamond tread steel.

Glass bead-coated foil-backed lane marking tapes conform to rough and irregular surfaces but are not designed as non-skid materials and indeed rapidly lose any such properties they initially possess.

Despite the long-recognized desirability of non-skid sheet material having excellent abrasion resistance, moisture resistance, tear resistance, and crack resistance, together with adequate stretch, elongation, and conformability to curved surfaces without having an elastic "memory" or recovery, such a product has never heretofore existed.

SUMMARY

This invention provides foil-backed non-skid sheet material suitable for installation on rough, irregular, and curved surfaces with which it maintains intimate contact over extended periods of time. Desired abrasion resistance, moisture resistance, tear resistance, and crack resistance, are combined with adequate elongation, stretchability, and deformability without the presence of harmful elastic "memory" or recovery.

The foil-backed non-skid sheet materials of this invention are ideally suited for installation on such rough and irregular surfaces as the patterned metal found in diamond tread steel decking or metal stairs. Further, these non-skid sheet materials are suited for such applications as grooved metal ladder rungs, curved truck fenders, and curved stair nosing, as well as flat surfaces. These sheets can be installed and conformed with a soft-head mallet such that they are adhered to both the high and low areas of patterned metal without cracking or tearing, the sheet material maintaining intimate contact after extended use.

BRIEF DESCRIPTION OF THE DRAWING

Understanding of the invention will be facilitated by referring to the accompanying drawing which is a cross-sectional view of a foil-backed non-skid sheet material embodying the principles of the invention.

In accordance with the invention, foil-backed non-skid sheet material 1 is prepared by adhering an "open coat" single layer of frictional particles 2 to one side of annealed aluminum foil backing 3 by means of flexible, abrasion-resistant, elastoplastic, silane-containing polyurethane binder 4. Normally tacky and pressure-sensitive adhesive 5 uniformly covers the rear-face of the foil backing and is desirably covered with release liner 6.

Foil backing 3 of this non-skid sheet material is annealed aluminum foil on the order of about one to about five mils thick. Annealing aluminum foil removes its temper making it soft, flexible, deformable, and conformable to irregular surfaces. The foil must have an elongation of at least 20% to withstand stretching over rough and irregular surfaces. Once stretched, aluminum foil remains in place and does not recover or return to its original length and pull away from the surface. Foil less than 1 mil thick is not satisfactory because it tears when conformed to a rough surface, while foil more than about 5 mils thick cannot be readily stretched and conformed.

The rear face of foil backing 3 is uniformly coated thereover with about 2 to about 10 mils of normally tacky and pressure-sensitive adhesive 5 which has excellent adhesion to aluminum foil and to most other surfaces, particularly metals. This adhesive should have excellent "wetgrab" or initial adhesion to assure adequate adhesion when the non-skid sheet is first placed on a rough surface. Further, the adhesive must have an elongation at least equal to that of the foil backing to insure adequate stretch and conformability to irregular surfaces. The adhesive must have a relatively low degree of recovery or elastic "memory" to reduce the possibility of the sheet pulling away from the irregular surface once it has been adhered. Suitable adhesives include acrylate: acrylic acid copolymers and tackified natural and synthetic rubbers, a 10:90 acrylic acid:isooctyl acrylate copolymer such as described in Example 7 of U.S. Re. 24,906 (Ulrich) being especially preferred.

The side of aluminum foil backing 3 opposite that coated with tacky and pressure-sensitive adhesive 5 has flexible, elastoplastic, abrasion-resistant, silane-containing polyurethane binder 4 adhered thereto. "Elastoplastic" refers to those urethane polymers having physical properties between elastomers and plastics and typically having a tensile strength on the order of about 2000 to about 6000 p.s.i. and an elongation on the order of about 100 to about 500%. Polyurethane binders are preferred because of their adhesion to metals, flexibility, and excellent abrasion-resistance. Those which have been found useful are the polymerized reaction product of aromatic diamines and poly-1,4-butylene glycol diisocyanates.

Approximately 6 to 30 grains of binder 4 is applied per 24 in.$^2$ of foil backing 3. Use of lower coating weight is possible but leaves frictional particles 2 excessively exposed and does not adequately adhere them to foil backing 3. Use of excessive binder covers the frictional particles so they do not impart adequate non-skid properties to sheet material 1. Binder 4 is sufficiently stretchy and flexible to conform to rough and irregular surfaces without breaking, tearing, or pulling away from the foil backing and has a low degree of recovery or "memory" such that it does not tend to pull sheet material 1 and adhesive 5 on the backside thereof away from rough and irregular surfaces.

It is necessary to include at least one silane in binder 4 to obtain adequate adhesion to foil backing 3. Silanes are chemical molecules having hydrolyzable groups at one end thereof and functionally reactive groups at the other end and are typically used for promoting adhesion. Typical of the hydrolyzable groups are trimethoxysilane and triethoxysilane groups which react with water to form silanol (SiOH) groups which can in turn react with each other by eliminating water to form Si—O—Si bonds. The functionally reactive groups are such as alkyloxy epoxy radicals, alkyl amines, and methacryloxypropyl. The addition of about 2 to about 10 parts, preferably about 5 parts, by weight of silane per 100 parts of polyurethane binder provides the necessary adhesion. Typical silanes which are particularly effective in promoting adhesion of elastoplastic polyurethanes to foil backing 3 are 3,4-epoxycyclohexylethyltrimethoxy silane, glycidoxypropyltrimethoxysilane, and gamma-aminopropyltriethoxysilane. Glycidoxypropyltrimethoxysilane and gamma-aminopropyltriethoxysilane are especially preferred because they are reactive with polyurethane binder 4. These silanes are liquids and may be added to binder 4 during the compounding thereof by stirring them into the solution.

An "open coat" single layer of frictional particles 2 is embedded in binder 4. An "open coat" layer of particles 2 covers about 50 to about 70% of the upper surface of sheet 1. It has been found that frictional particles 2 should have a coating weight on the order of 45 to 70 grains/24 in.$^2$, preferably about 55 to about 65 grains/24 in.$^2$, for silicon carbide particles. (Coating weight for a given type of particle is, of course, directly related to its specific gravity.) Lower particle coating weights yield a sheet material which is subject to excessively rapid wear. Higher particle coating weights yield sheet material which is not adequately flexible; further, the frictional particles begin to pile on top of each other, whereby they are not securely held in place by binder 4 and are easily broken loose by abrasion. Preferred frictional particles for use in this non-skid sheet material include silicon carbide, aluminum oxide, cork, and rubber. Frictional particles 2 are preferably on the order of about 50 to about 80 mesh, i.e., will pass through a 50 mesh U.S. Standard sieve but not pass through an 80 mesh U.S. Standard sieve. Smaller frictional particles do not protrude sufficiently far to provide effective non-slip properties, while it is difficult to adhere larger frictional particles adequately in binder 4 without unduly stiffening the sheet product.

It is preferred that a size coat 7 be applied over frictional particles 2 to assist in anchoring them to backing 3. Size coat 7 should be applied in an amount on the order of 6 to 30 grains, preferably 8 to 20 grains per 24 in.$^2$. A lesser amount of size coat 7 provides no significant additional adhesion for frictional particles 2, while a greater amount of size coat fills the space between frictional particles 2 and not only reduces their effectiveness but also seriously reduces conformability of the entire structure. Size coat 7 should be flexible, elastomeric, abrasion-resistant and generally have the same elongation, recovery, and stress-strain characteristics as binder 4; preferably it has the same composition.

It has been found possible to correlate non-skid properties and quality of a non-skid sheet material to various tests to determine whether or not the product will perform satisfactorily. For example, wearability of a non-skid sheet material and thus its life or longevity can be determined by a wear test on patterned metal which simulates shoe scuffing. A sample of non-skid sheet material 1 at least 16 in.$^2$ is adhered to a piece of diamond tread steel plate by means of a soft-headed mallet which stretches the sheet material and adheres tacky adhesive 5 to the high and low spots of the diamond tread. An individual then stands directly over the test sample and administers repeated low angle (about 15°) scuffing kicks to the sample with the sole and heel of his shoe. A satisfactory product survives at least 30 kicks without tearing and without loss of more than 10% of the frictional particles on the high spots of the diamond tread.

Non-skid sheet material used in such applications as outdoor strair treads, etc., must have adequate moisture resistance. Adhesion of binder 4 to foil backing 3 is readily and rapidly determined by placing a sample specimen in tap water at 125° F. for 24 hours. Following soaking, an attempt is made to peel the binder from the foil backing. Binders having adequate adhesion do not pull loose from the foil backing while binders having poor adhesion will be partially or completely removable from foil backing. It has been found that polyurethane binders without silane fail this test, as do most other types of binders.

A mandrel is utilized to determine the flexibility, conformability, deformability, and recovery or elastic "memory" of a non-skid sheet material. A 1-inch strip of non-skid sheet material, without tacky adhesive on its back surface, is centered on and wrapped around a ⅛" mandrel so the foil surfaces contact each other and are pinched tight, thereby forming a foil structure having a cross-section resembling a cotter-key. Cracking or breaking of the binder is readily observed during this bending. The bent sample is removed from the mandrel, allowed to stand for 1 hour, and the angle included between the adjacent ends measured. The larger the included angle, the greater the degree of undesirable recovery or elastic "memory" that the sample has. It is desired that the angle of recovery be low (e.g., less than about 65°) for effective conformability. Test specimens having an excessively heavy coat of frictional particles or an excessively heavy size coat have a recovery greater than 65° and fail this test. Binders of such polymers as epoxies, vinyls, and acrylics, fail by cracking and breaking.

Another method of determining conformability of non-skid sheet materials is to wrap a ½ inch wide sample spirally around a ½ inch diameter rod so that the edges of the sheet material are adjacent each other. As time passes, non-conformable materials which are stiff or which have excessive elastic "memory" begin to overcome the adhesion of pressure-sensitive adhesive 5 and begin to unwrap from the rod. After 144 hours at room temperature, the radial distance between the surface of the rod and the end of the test specimen is measured. A recovery in excess of ¹⁄₆₄ inch is excessive and indicates a non-conformable material. Heavy mineral coatings, heavy binder coatings, heavy size coatings, and excessively stiff adhesive all contribute to separation of the spiral wound test sample. Separation occurs on this spiral rod test if any of these factors are not within the previously mentioned preferred ranges.

The following examples, in which all parts are by weight unless otherwise noted, illustrate preparation of the foil-backed non-skid sheet material of this invention, without limiting the scope thereof.

DESCRIPTION OF PREFERRED EMBODIMENT

Premix A was prepared by dissolving 46.2 parts of a 100% solids urethane elastomer having blocked isocyanate curing sites (ketoxime-blocked poly-1,4-butylene glycol diisocyanate, having a molecular weight of about 1500—"Adiprene" BL–16, E. I. du Pont de Nemours and Co. Inc.), in 12 parts of ethylene glycol monoethyl ether acetate, adding 18.5 parts of fibrous talc ("Mistron" T–076, Sierra Talc Co.), 2.3 parts of lamp black, and blending until a smooth homogeneous mixture was obtained. Premix B was prepared by dissolving 35 parts of p,p'-methylene dianiline (sufficient to provide approximately 1NH$_2$ group for each NCO group) in 65 parts of ethylene glycol monoethyl ether acetate. A binder was then made by combining 79 parts of premix A, 17.1 parts of premix B, 2.2 parts of glycidoxypropyltrimethoxysilane ("Silane" Z–6040, Dow-Corning Corporation), and sufficient ethylene glycol monoethyl ether acetate to provide a viscosity of 1500 cps. at 75° F.

The binder, which should be used within 24 hours, was rolled coated onto the shiny side of 3.3 mil 1145-0 annealed dead-soft aluminum foil at a wet coating weight of 18–20 grains per 24 sq. inches. Grade 50–80 silicon carbide particles were evenly drop coated into the adhesive at a coating weight of 55–65 grains per 24 sq. inches. The binder was then cured at 190–200° F. for 24 hours, cooled, and a size coat applied. The size coat composition was the same as the binder composition except the viscosity was adjusted to 670 cps. and it was applied at a coating weight of 14–16 grains per 24 sq. inches, which resulted in a coating weight of 9–11 grains per 24 sq. inches after curing at 190–200° F. for 24 hours. Adequacy of curing and adhesion of the binder and the size coat to the foil backing are determined by submerging a small test sample in methylene chloride for 5 minutes. A properly cured binder does not show loss of adhesion to the foil backing, whereas an uncured or poorly cured binder can be easily removed from the foil backing.

A normally tacky and pressure-sensitive 10:90 acrylic acid:isooctyl acrylate copolymer such as described in Example 7 of U.S. Pat. No. Re. 24,906 (Ulrich) was applied to the back side of the foil by standard roll coating techniques and dried to provide a coating weight of 28 grains per 24 sq. inches. A silicone treated paper liner was then laminated to the pressure-sensitive adhesive to prevent inadvertent sticking of the adhesive during packaging and shipment.

Test specimens of this non-skid material were subjected to the previously described shoe scuffing test on patterned metal, passing thirty scuff cycles with only 1% wear. There was no tearing or other failure of the foil backing. The binder remained securely attached to the foil backing during the 125° F. water soak. No cracking, breaking, or delamination was observed when the test specimens were bent around a ⅛ inch diameter mandrel, the included angle of recovery after 1 hour being 47°. Test specimens spirally wound around a ½ inch rod in the manner previously described showed no release or separation from the rod. A foil-backed non-skid sheet material made in the same manner as this example, but without silane, was found to show 5% wear after 30 scuff cycles and failed the 125° F. water test, the binder coming loose from the backing.

What we claim is:

1. Non-skid sheet material especially suitable for installation on rough, irregular, and curved surfaces with which it maintains intimate contact over extended periods of time, comprising in combination:
   an annealed aluminum foil backing having a thickness on the order of about one to about five mils,
   about two to about 10 mils of normally tacky and pressure-sensitive adhesive uniformly coated over one surface of said backing,
   about six to about 30 grains per 24 in.² of flexible, elastoplastic, abrasion-resistant, silane - containing polyurethane binder extending over the side of said backing opposite said adhesive, said polyurethane consisting essentially of the reaction product of at least one aromatic diamine, and at least one poly-1,4-butylene glycol diisocyanate, and
   a single layer of frictional particles adhered to the foil backing by said binder, said particles uniformly covering about 50 to about 70% of said backing,
   whereby said non-skid sheet material has excellent abrasion resistance, moisture resistance, tear resistance, and crack resistance, together with adequate stretch, and elongation characteristics to permit conformability to rough, irregular and curved surfaces without having an elastic "memory" or recovery.

2. The non-skid sheet material of claim 1 wherein the silane is selected from the group consisting of glycidoxypropyltrimethoxysilane, gamma-aminopropyltriethoxysilane, and 3,4-epoxycyclohexylethyltrimethoxysilane.

3. The non-skid sheet material of claim 1 wherein the aromatic diamine is p,p'-methylene dianiline.

4. The non-skid sheet material of claim 1 wherein the binder essentially contains about 2 to about 10 parts by weight of glycidoxypropyltrimethoxysilane per 100 parts of polyurethane.

5. The non-skid sheet material of claim 1 wherein the polyurethane consists essentially of the reaction product of poly-1,4-butylene glycol diisocyanate and p,p'-dimethylene dianiline in sufficient quantity to provide approximately 1NH$_2$ group for each NCO group of said diisocyanate.

6. The non-skid sheet material of claim 1 having a size coat over said binder and said frictional particles.

7. The non-skid sheet material of claim 1 wherein said frictional particles are silicon carbide.

8. The non-skid sheet material of claim 1 wherein the tacky pressure-sensitive adhesive has a release liner adhered thereover.

References Cited
UNITED STATES PATENTS

| | | | |
|---|---|---|---|
| Re. 25,778 | 5/1965 | LaBore et al. | 161—406 |
| 1,992,176 | 2/1935 | Benner et al. | 161—162 |
| 2,085,845 | 7/1937 | Binkley | 161—162 |
| 3,030,223 | 4/1962 | Alstad et al. | 117—26 |
| 3,510,439 | 5/1970 | Kaltenbach et al. | 161—190 |

JOHN T. GOOLKASIAN, Primary Examiner

G. W. MOXON II, Assistant Examiner

U.S. Cl. X.R.

117—26, 29, 33; 161—164, 167, 190, 406